United States Patent Office 2,834,731
Patented May 13, 1958

---

2,834,731

HYDROCARBON OIL EMULSIFIER

John F. Carpenter, Clark, N. J., assignor to Esso Research and Engineering Company, a corporation of Delaware No Drawing. Application January 11, 1956
Serial No. 558,402

4 Claims. (Cl. 252—8.9)

This invention discloses a unique emulsifier combination for use in paraffinic hydrocarbon oils, such as chemically treated petroleum white oils.

It is known to those skilled in the art of emulsification that to obtain a stable emulsion with paraffinic oils is particularly difficult. The term paraffinic is used here to include open- and closed-chain (cycloparaffinic) hydrocarbons. The formulation of an emulsifiable concentrate which possesses good storage stability known as "shelf life," is additionally difficult.

For various uses of paraffinic or naphthenic oil emulsions, such as in textile oils, lubricants, anti-rust oils, and agricultural applications, good shelf life is required for uniformity of treatment, as well as the desired emulsion stability with various kinds of water.

Good shelf life may be defined as stability of the oil concentrate over prolonged storage. Instability of the emulsifiers is evidenced by excessive separation of water from an aqueous emulsion of the concentrate by separation of the emulsifier from the oil, and by detrimental effects of the emulsion applied to plants or materials to be coated by the emulsion.

Now is found an emulsifier combination of an alkylaryl polyethylene glycol and a polyoxyalkylene fatty ester which meets critical requirements of stability in a variety of tests.

The preferred emulsifier combination is (A) nonylphenyl ether of diethylene glycol and (B) pentaethylene glycol ester of oleic acid. Each of the foregoing types will be referred to by the abbreviations (A) and (B). In the aromatic ether type (A), preferably a $C_8$ to $C_{10}$ alkyl group, and more preferably, a $C_9$ alkyl group is a substituent of the phenoxy ring which in turn is linked by an ether oxygen linkage to two to four ethylene oxide units. The ester type (B) contains preferably an average of about 4 to 6 ethylene glycol units ($C_2H_4O$) linked to the $C_{18}$ fatty acid radical.

Each of the mixed anionic emulsifiers described, (A) alkylaryl polyethylene glycol and (B) polyethylene glycol fatty ester, are preferably used in a weight ratio of about 0.5 to 1% with respect to the hydrocarbon oil to obtain the superior emulsion concentrate. The mixture thus formulated is superior to either type used alone and superior to numerous emulsifiers and combinations tested for the objects of the present invention.

Tests which demonstrate the superior performance of the (A) and (B) combination emulsifier are shown in the following table.

TABLE

Emulsifier performance in 200 S. U. S./100° F. paraffinic oil
[S. U. S.=Saybolt Universal viscosity in seconds.]

| Wt. percent | Type of Emulsifier | Stability of 50 Vol. percent Aqueous Emulsion Formulation; percent $H_2O$ Separation in One hour | | Life, Days' Storage at 40° F. Prior to Failure of Emulsion Stability | Days at 40° F. to first Separation of Emulsifier |
|---|---|---|---|---|---|
| | | Distilled $H_2O$ | 600 p. p. m. Hardness | | |
| 0.8 | (A) | 4 | 6 | 150+ | 7-20 |
| 0.6 | (B) | | | | |
| 0.9 | (A) | 7 | 7 | | |
| 0.5 | (B) | | | | |
| 1.0 | (A) | 18 | 22 | 15 to 30 | 6-20 |
| 6.0 | (B) | 0 | 0 | 1 | 1 |

The paraffinic oil to be used in formulating the emulsifier concentrate is chiefly a naphthenic and paraffinic oil made aromatic free by exhaustive treatment with sulfuric acid or oleum. These oils are known in the art. They have specific gravities of about 0.8 to 0.885, Saybolt Universal second (S. U. S.) viscosities measured at 100° F. in the range of 80 to 370, and boil mainly in the range of 550° to 1000° F.

A typical petroleum white oil suited for use with the emulsifier combination has the following inspection:

Viscosity, S. U. S., @ 100° F _____ 150
Sp. gr _____ 0.864
A. S. T. M. distillation, ° F., 1 atm.:
    Initial point _____ 560
    Final point _____ 975
Aniline point, ° F _____ 230
Percent aromatics _____ Trace With particular regard to uses of the oil concentrates containing combined emulsifiers for agricultural purposes, tests have shown the emulsions prepared from the concentrate of the (A) and (B) types to be very satisfactory in giving very slight or no injury to plants, compared with oils containing various other emulsifiers.

The oil concentrates may contain various other ingredients, such as a fungicide, insecticide, defoliant agents, antioxidants, and light filtering agents, etc. for agricultural processes in which low phytotoxicity is an important consideration.

To use the dual emulsifier-oil concentrates for preparing oil-water emulsions, enough water is admixed with the concentrate to have the emulsion contain 25 to 85 volume percent $H_2O$. For a general application emulsion, 50 vol. percent $H_2O$ is used with about 50 vol. percent of the oil in which 1.0 to 2.0 wt. percent of the combined emulsifier is present.

Concentration of the mixed emulsifiers is critical as shown by many stability tests. The 50% water aqueous emulsion of the white oil concentrate in soft or distilled water and in hard water (600 p. p. m. hardness) should show less than 35 vol. percent water separation when standing one hour after shaking.

The preferred ingredients and proportions in the presently discovered high quality emulsion concentrates are:

98 to 99 weight percent of 150 to 300 S. U. S./100° F. white oil.
0.6 to 1.0 wt. percent alkylarylether of polyethylene glycol (A).
0.4 to 0.9 wt. percent polyoxyethylene fatty ester (B).

In the preferred formulation it is advantageous to use a slightly higher proportion of the (A) type than of the (B) type emulsifier for the desired increase of stability, e. g.

0.8 to 0.9 wt. percent of the $C_9$ alkylarylether of diethylene glycol.
0.5 to 0.6 wt. percent of the polyoxyethylene fatty ester.

The following examples demonstrate the utility of the invention:

Examples

Numerous stability tests were made on emulsions of concentrates containing various emulsifiers. These tests showed that the combined emulsifier of the present invention was outstanding for performance in both soft and hard waters and shelf life.

Satisfactory stability was obtained with a paraffinic white oil of 200 S. U. S./100 viscosity containing 0.6 to 0.9 wt. percent nonylphenoxy diethylene glycol and 0.5 to 0.6 wt. percent of pentaethylene glycol ester of oleic acid, using this concentrate with 50 vol. percent of soft or hard water. Less than 10 percent of water separated from the aqueous emulsion shaken one-half minute, then allowed to stand for one hour in a 100 cc. graduate.

Tests were run in the field to determine injury caused by the oils and various emulsions applied to tobacco plants. The average dosage was 3 cc. per plant. From slight to severe injury such as dry rot was manifest on using unemulsified white oils (paraffinic and naphthenic) and in using the many different kinds of emulsifier concentrates.

Outstanding good results were obtained in the yields using the concentrate of the mixed (A) and (B) emulsifiers, whereas either of these substances used by itself or in other combinations tended to result in a perceptibly greater degree of injury.

The invention claimed is:

1. A water-emulsifiable oil concentrate which comprises a paraffinic petroleum white oil containing about 0.5 to 1 wt. percent of an alkylphenoxy ether of diethylene glycol, the alkyl group substituent in the phenoxy group containing about 9 carbon atoms, and 0.5 to 1 wt. percent of monooleate ester of polyethylene glycol containing 4 to 6 ethylene glycol units.

2. A water-emulsifiable oil concentrate which comprises a paraffinic petroleum white oil containing 0.6 to 0.9 wt. percent of nonylphenoxydiethylene glycol and 0.5 to 0.6 wt. percent of pentaethylene glycol ester of oleic acid.

3. A water-emulsifiable oil concentrate which comprises a white oil containing 0.5 to 1 wt. percent of an alkylphenoxy polyethylene glycol in which the alkyl group has 8 to 10 carbon atoms and 2 to 4 ethylene oxide units are present in the polyethylene glycol and containing 0.5 to 1 wt. percent of a polyethylene glycol ester of a $C_{18}$ fatty acid with 4 to 6 ethylene oxide units.

4. An oil concentrate useful for application to agricultural plants containing the ingredients defined in claim 3, wherein alkyl phenoxy polyethylene glycol contains 9 carbon atoms in the alkyl group and 2 ethylene oxide units and the polyethylene glycol ester of the $C_{18}$ fatty acid is a pentaethylene glycol ester present in a lower weight proportion than the alkyl phenoxy polyethylene glycol.

References Cited in the file of this patent

UNITED STATES PATENTS

| | | |
|---|---|---|
| 1,970,578 | Schoeller | Aug. 21, 1934 |
| 2,746,853 | Yowell | May 22, 1956 |